Patented Dec. 20, 1938

2,140,794

UNITED STATES PATENT OFFICE 2,140,794

TREATMENT OF SOYA BEAN OIL

Albert K. Epstein and Myron L. Hartley, Chicago, Ill.; said Hartley assignor to said Epstein No Drawing. Application August 28, 1937, Serial No. 161,522

19 Claims. (Cl. 260—420)

Our invention relates to the treatment of certain types of oils, especially soya bean oil, and is particularly concerned with improving the quality thereof whereby its utility in the field of edible oils and fats is markedly increased.

It has been known for some considerable time that edible soya bean oil, including edible soya bean oil which has been refined, bleached and deodorized under the best existing commercial methods, undergoes a type of spoilage which is characterized as "reversion" when exposed to light and air and, even though somewhat more slowly, when stored in the absence of light and air. This reversion manifests itself in an acquisition by the soya bean oil of various off-flavors such as "beany" flavor, or sometimes described as fishy, which subsequently often become intensified and altered with the production of other undesirable flavors described as "oleo" and "grassy" or "fishy". This type of spoilage is characteristic of soya bean oil. Even when edible, refined, bleached and deodorized soya bean oil is subjected to hydrogenation to produce a product having a melting point of from about 95 degrees F. to 100 degrees F., said partially hydrogenated oil also reverts, particularly when exposed to air and light, after a few days and acquires an oleo-like flavor which becomes intensified with time. Even when the oil is kept in the dark, the above type of spoilage occurs in the bean oils in the course of time.

As a result of the disadvantageous properties of soya bean oil, as briefly described above, considerable difficulties and objections have been encountered in utilizing this oil in the food industries, such as in salad oil and particularly in dry plastic shortenings and in margarine. In the manufacture of margarine especially, reversion takes place relatively more quickly because of the presence of moisture and other substances. While there is a decided advantage from an economic standpoint to employ soya bean oil in the food industries, primarily because of the abundance and ready sources and availability of such oil, nevertheless the problems encountered have acted as definite deterrents to the stimulation of such uses of soya bean oil.

We have discovered that, by treating soya bean oil with certain reagents in certain proportions and under proper temperature and pressure conditions, products are obtained which keep in good condition without reversion for periods of time substantially in excess of the time before reversion sets in without the treatment of our invention. The practical effect of this treatment is that the commercial utility of soya bean oil in the food industry is tremendously increased.

The improvement in the soya bean oil by reason of our treatment thereof manifests itself also in other respects, the most notable of which appears to lie in the reduction of color of the treated oil.

It is accordingly an object of our invention to improve soya bean oil, particularly to enhance its utility for use in food products.

Another object of our invention concerns itself with substantially extending the stability or "pre-reversion" period of soya bean oil.

Still another object of our invention resides in reducing the color of soya bean oil.

Another object of our invention deals with the provision of a novel method of treating soya bean oil to improve the same, particularly with reference to extending or prolonging the period preceding reversion or, in other words, the pre-reversion period.

Yet another object of our invention is the provision of a novel soya bean oil possessing the property of keeping for relatively long periods of time without development of off-flavors.

Another of the objects of our invention is concerned with the development of a method of treating soya bean oil to improve the same, especially with regard to extending the period preceding reversion, which method may easily be combined and coordinated with present practices in the art of treating edible oils and fats, particularly with respect to the refining thereof.

With these objects in view and others which will appear as the nature of our invention is made clear in the light of the following description, we shall address ourselves to fully explaining the various phases of our invention.

In general, our invention is predicated on the discovery that when sugars are added in small amounts to soya bean oil and the oil is subjected to elevated temperatures, particularly under reduced pressures, in the presence of steam or other non-oxidizing vapor or gas, such as nitrogen, the resulting oil possesses new properties; its pre-reversion period is substantially prolonged and it undergoes a definite reduction in color. The steam or non-oxidizing gas serves to sweep out the volatile constituents of the oil undergoing treatment.

We have found that, in order to achieve our best results, the soya bean oil admixed with the sugar must be treated in a non-oxidizing atmosphere such as steam, nitrogen, carbon dioxide or the like, particularly under reduced pressure, and at temperatures of the order of those employed in edible oil deodorization commercial processes, namely, about 360 degrees F. to 500 degrees F., preferably at about 430 degrees F. Under these conditions, a reaction evidently takes place between some of the constituents of the soya bean oil and the sugar and it is our belief that it is this reaction product which forms at the elevated temperatures which is responsible for the prolongation of the good flavor and retards the development of the so-called "beany" or "fishy" flavor in the soya bean oil. The use of elevated temperatures also serves, with the steam or other non-oxidizing gas, to deodorize the bean oil and to volatilize any undesirable constituents formed by the interaction of the sugar and some of the constituents of said oil. Although we have not yet fully ascertained the mechanism of the reaction which takes place and appears to account for this unusual and unexpected retardation of the development of "beany" or specific off-flavors in the treated soya bean oil, it is our present theory that the sugar reacts with the conjugated double bonds of the coloring matter, such as carotene, present in the soya bean oil. We postulate this theory because, in general, simultaneously with the improvement of the keeping properties or prolongation of the pre-reversion period of the soya bean oil, there is also a bleaching effect upon or reduction of color of said oil. While we are not to be bound by any theoretical considerations, we have offered the same as a possible explanation of why we obtain the results which we have already generally described and which will be more fully detailed hereinafter. At any rate, that a reaction takes place under the conditions of our treatment cannot be gainsaid since the mere addition of the sugar to soya bean oil does not serve to prolong or extend the pre-reversion period thereof.

The sugars which we have found efficacious for our present purposes are of varied character including monosaccharides, disaccharides, trisaccharides and the like. Among those with which we have obtained particularly good results are sucrose, dextrose, galactose, levulose, lactose, arabinose, maltose and the like. Everything considered, we have found that ordinary sucrose is the most satisfactory of the sugars and, therefore, we prefer to employ the same.

Generally speaking, crude soya bean oil, produced by the expeller process or by the solvent process, contains a fraction of one per cent of free fatty acids, this, however, being variable. Such oil is refined in accordance with conventional processes involving neutralization of the free fatty acids with alkali or alkaline materials, removal of the resulting soap, drying, and bleaching with such agents as fuller's earth or carbon black. The oil may then, if desired, be hydrogenated in accordance with known practice to produce a product having a melting point of about 95 degrees F. to 100 degrees F. whereby it may be employed as a constituent of margarine or dry bakery shortenings. If desired, the hydrogenated soya bean oil may be washed again with a slight amount of alkali and introduced into a deodorizing still and deodorized with superheated steam under reduced pressure.

We have found that we obtain excellent results with economy of treatment if the sugar, in proper proportions, is added to the soya bean oil just prior to the deodorization thereof with superheated steam under reduced pressure. The subjection of the soya bean oil, admixed with the sugar, to these conditions of temperature and reduced pressure produces a definite change in the oil in that some constituent or constituents of the soya bean oil which cause or promote reversion become fixed and inactive while undesirable constituents formed or present become volatilized, thereby producing a product which keeps in good condition for relatively long periods of time without development of oleo-like or fishy or grassy flavors.

While liquid soya bean oil may be treated in accordance with our process, the advantages thereof are not nearly so great as in conjunction with the treatment of hydrogenated soya bean oil. Our process, accordingly, finds its chief utility in the treatment of hydrogenated soya bean oil. The sugar may be added at any suitable stage of the process of treating the soya bean oil although the exact results may vary somewhat. It is only necessary that the mixture of the soya bean oil and the sugar be subjected to a temperature sufficiently high to react, as, for example, about 360 degrees F. to 500 degrees F. under reduced pressure for the requisite length of time, which will vary with the size of the batch undergoing treatment, generally a matter of one hour or several hours during which period the oil is also deodorized. While the soya bean oil admixed with the sugar could be subjected to the heat treatment in an inert or substantially non-oxidizing atmosphere, such as indicated above, followed by steam deodorization under reduced pressure at elevated temperatures of the character described, we have found it to be considerably more economical and somewhat better results are obtained if the treatment is effected as a part of and concomitant with the steam deodorization treatment to which the oils are subjected, the time being sufficiently long, generally six or seven hours in large scale commercial operations, so as to drive off undesirable volatile constituents present in the oil or which might be formed in the reaction.

The sugar may be incorporated into the soya bean oil in various ways. One satisfactory method is to form an intimate mixture of the sugar with a relatively small amount of the oil or to disperse the same in a small amount of the oil and then add the resulting mixture to the large batch of oil. Another method, not quite so satisfactory, comprises mixing several per cent of the sugar with the hydrogenated soya bean oil and subjecting the same to a temperature of between 360 degrees F. and 500 degrees F., preferably about 400 degrees F. to 430 degrees F., at a reduced pressure in the presence of superheated steam for a few hours, filtering the treated oil and adding the same to a large batch of hydrogenated soya bean oil so that the approximate percentage of the sugar initially present would, on the basis of said large batch of oil, be about 0.2%. The resulting mixture may then be subjected to the deodorization treatment described above. This latter procedure, while producing a relatively clear oil, does not give an oil which has quite the keeping properties of the oils when produced by directly incorporating the sugar therein and subjecting to the deodorization treatment.

As a result of the treatment process of our invention, the sugar caramelizes and then carbonizes at the elevated oil deodorization temperatures. The carbon is readily removed by filtration of the treated oil. However, the oil acquires a cloudy appearance which does not appear to be removable by filtration. This cloudiness, however, in no manner affects its utility and when the hyrogenated oil cools down to room temperature and solidifies, the cloud, of course, vanishes. Just what causes the cloudiness has not yet been ascertained but it is our belief that it is intimately related to the reaction which takes place between the sugar and the soya bean oil and produces the unusual results of our invention. In general, the lower the temperature of treatment, the less pronounced is the cloudiness, but, also, the pre-reversion period is not so prolonged when operating at the lower temperatures.

The following examples are illustrative of methods of practicing our invention. It will be understood, however, that said examples are given by way of illustration only and are not to be construed as limitative of the full scope of our invention as taught herein.

Example A

To a partially hydrogenated soya bean oil having a melting point of 100 degrees F. there was added 0.2% by weight of sucrose and the mixture was heated with superheated steam for six hours at a temperature of 430 degrees F. at an absolute pressure of 7 mm. of mercury to remove undesired volatile constituents. The oil was then filtered. In an accelerated test made by placing a sample of the oil thus treated in a bottle and exposing it to light, the oil kept in good condition for twenty-five days. A batch similarly treated but omitting the sucrose, or in other words the blank, kept only six days before reversion set in under the same accelerated test.

Example B

Crude soya bean oil was refined in the conventional way by neutralization with alkali, removal of the resulting soap, drying and bleaching, and was then partially hydrogenated. It was then mixed with 0.1% by weight of levulose and the mixture was heated at 430 degrees F. at an absolute pressure of 6.5 mm. of mercury for a period of several hours until undesired volatile constituents were removed. In an accelerated test, as described in Example A, the oil thus treated kept in good condition for 20 days as against 6 days for a batch similarly treated but without the addition of the levulose.

Example C

To a soya bean oil partially hydrogenated so that it had a melting point of between 95 degrees F. and 100 degrees F., there was added 0.2% by weight of lactose. The resulting mixture was then heated at 430 degrees F. with superheated steam under an absolute pressure of 7 mm. of mercury for seven hours to remove undesirable volatile constituents. In an accelerated test, as described in Example A, the treated oil kept in good condition for 22 days as against 6 days for a sample similarly treated but without the addition of the lactose.

Example D

To a partially hydrogenated soya bean oil having a melting point of 100 degrees F., there was added 0.2% of arabinose and the mixture was subjected to the conditions of treatment described above in Example A. The treated oil kept in good condition for 18 days as against 6 days for the blank.

Example E

Using 0.1% dextrose in one case and 0.2% dextrose in another case, and carrying out the treatment as described above in Example A, the treated oil in each case kept in good condition for 21 days as against 6 days for the blank.

Example F

Using 0.1% galactose in one case and 0.2% galactose in another case, and carrying out the treatment as described above in Example B, the treated oil in each case kept in good condition for 21 days as against 6 days for the blank.

Example G

Using 0.1% maltose in the first case and 0.2% maltose in the second case, and carrying out the treatment as described in Example B, the treated oil in the first case kept in good condition for 20 days and the treated oil in the second case kept in good condition for 22 days. The blank kept well for only 6 days.

The proportions of the sugars employed may be varied within certain ranges. In general, we have found that if less than about 0.1% of a sugar, based on the weight of the soya bean oil, is employed the results obtained are not so satisfactory as when slightly greater proportions are utilized. In those cases where increased amounts of the sugars are not positively detrimental, their use ordinarily is not justified since smaller amounts function just as effectively at less cost. The proportions vary somewhat with respect to particular soya bean oils and the extent to which they may have been hydrogenated. Moreover, it will be appreciated that the various sugars possess slightly varying efficacies which obviously affects the amounts to be employed for optimum results. In general, bearing in mind the statements made above and the variability of different factors, we employ proportions ranging between about 0.1% and 0.5% of the sugars, and preferably about 0.2%.

We have referred hereinabove to the temperatures which are utilized in our process. It is evident that any temperature, sufficiently high to effect the reaction between the sugars and the soya bean oil but not so high as to have an undesirable effect on the oil or to cause objectionable decomposition to take place, may be employed. We have stated that temperatures of 360 degrees F. to 500 degrees F. have proven satisfactory. Excellent results have been obtained at about 390 degrees F. to 440 degrees F. and particularly at 430 degrees F. In general, to reiterate, the temperature must be high enough to volatilize, with the superheated steam or the like, the undesirable volatile constituents present in the oil and those which may be formed as reaction products.

The degree of vacuum utilized is, of course, subject to variation. Excellent results have been obtained with absolute pressures of 6.5 mm. to 15 mm. of mercury but the operative range extends beyond either limit. In general, other things being equal, at low pressures the quality of the products obtained is an inverse function of the pressure, i. e., the lower the pressure, the better the product.

As we have previously stated, concomitantly with the extension or prolongation of the pre-reversion period of the soya bean oil as a result of our treatment, there is, as a general rule, a reduction in color over and above that which is due to the steam deodorization treatment in those instances where we utilize our process in conjunction therewith. For example, with some partially hydrogenated soya bean oils having a melting point of about 100 degrees F., the color has been reduced by our treatment from about 12 Yellow and 1.5 Red (Lovibond scale) to from 4.5 to 5.0 Yellow and about 0.6 to 0.7 Red. In the blank, that is, without the addition of a sugar, the deodorization treatment reduced the color of the original hydrogenated soya bean oil from 12 Yellow and 1.5 Red to 8 Yellow and 1.0 Red. In other words, some types of soya bean oil undergo somewhat of a bleaching or reduction in color during steam deodorization thereof when the sugars are not employed. However, such oils acquire a beany, fishy, grassy or oleo-like flavor relatively quickly. If, however, as we have described, the same oil is subjected to the same temperature and deodorization treatment but in the presence of a sugar incorporated therein prior to subjection to deodorization, there is an improvement not only in color but also in the keeping properties of the oil.

In the copending application of Albert K. Epstein, Serial No. 137,046, filed April 15, 1937, now Patent No. 2,128,926, there is disclosed a process of treating soya bean oils to prolong the pre-reversion period thereof which includes the use of small proportions of phosphoric acid esters. We have found the excellent results are obtained in our present invention if we employ a mixture of a sugar and a very small proportion of a phosphoric acid ester, the latter constituting about 0.001% to 0.005%, based on the weight of the oil; and subjecting the mixture thereof with soya bean oil to the treatment conditions described hereinabove.

Wherever the term "hydrogenated soya bean oil" is employed herein, it will be understood to cover products which are hydrogenated to various extents to produce products having different melting points.

What we claim as new and desire to protect by Letters Patent of the United States is:

1. In a method of improving soya bean oil, particularly with respect to extending its pre-reversion period, the steps which comprise mixing said oil with not substantially less than 0.1%, based on the weight of the oil, of a sugar, and heating the resulting mixture under reduced pressure and at edible oil deodorization temperatures for a length of time sufficient to drive off undesirable constituents.

2. In a method of improving hydrogenated soya bean oil, particularly with respect to extending its pre-reversion period, the steps which comprise mixing soya bean oil with between about 0.1% and 0.3%, based on the weight of the oil, of a sugar, and heating the resulting mixture under reduced pressure at a temperature between about 360 degrees F. and 500 degrees F. for a length of time sufficient to substantially deodorize the oil.

3. In a method of improving hydrogenated soya bean oil, particularly with respect to extending its pre-reversion period, the steps which comprise mixing soya bean oil with not substantially less than 0.1%, based on the weight of the oil, of a sugar, and heating the resulting mixture under reduced pressure and in the presence of superheated steam at edible oil deodorization temperatures for a length of time sufficient to substantially deodorize the oil.

4. In a method of improving hydrogenated soya bean oil, particularly with respect to extending its pre-reversion period, the steps which comprise mixing soya bean oil with between about 0.2%, based on the weight of the oil, of sugar, and heating the resulting mixture under reduced pressure and in the presence of superheated steam at edible oil deodorization temperatures for a length of time sufficient to substantially deodorize the oil.

5. The process of claim 1, wherein the sugar is sucrose.

6. The process of claim 4, wherein the sugar is sucrose.

7. The process of claim 3, wherein the soya bean oil, subsequent to treatment with the sugar, is filtered.

8. The process of claim 4, wherein the soya bean oil, subsequent to treatment with the sugar, is filtered.

9. Soya bean oil, having an improved color and an extended pre-reversion period, comprising the reaction product under reduced pressure and at edible oil deodorization temperatures, of soya bean oil and not substantially less than 0.1%, based on the weight of said oil, of a sugar.

10. Hydrogenated soya bean oil, having an improved color and a substantially extended pre-reversion period, comprising the reaction product, under reduced pressure, in the presence of super-heated steam, and at edible oil deodorization temperatures, of hydrogenated soya bean oil and between about 0.1% and 0.3%, based on the weight of said oil, of a sugar.

11. Hydrogenated soya bean oil, having an improved color and a substantially extended pre-reversion period, comprising the reaction product, under reduced pressure and at edible oil deodorization temperatures, of soya bean oil and of the order of 0.2%, based on the weight of said oil, of sucrose.

12. Partially hydrogenated soya bean oil, having an improved color and a substantially extended pre-reversion period, comprising the reaction product, under reduced pressure and at edible oil deodorization temperatures, of soya bean oil and not substantially less than 0.1%, based on the weight of said oil, of sucrose.

13. Partially hydrogenated soya bean oil, having an improved color and a substantially extended pre-reversion period, comprising the reaction product, under reduced pressure, in the presence of super-heated steam, and at edible oil deodorization temperatures, of hydrogenated soya bean oil and between about 0.1% and 0.5%, based on the weight of said oil, of a sugar.

14. The method of improving partially hydrogenated soya bean oil, particularly with respect to extending its pre-reversion period, which comprises mixing said oil with not substantially less than 0.1% of a sugar, and heating the resulting mixture under an absolute pressure of about 6.5 mm. to 15 mm. for several hours in the presence of superheated steam to remove volatile constituents, the percentage of said sugar being based on the weight of the oil.

15. The method of improving hydrogenated soya bean oil, particularly with respect to extending its pre-reversion period, which comprises mixing said oil with between about 0.1% and 0.5%, based on the weight of the oil, of sucrose, and heating the resulting mixture under reduced pressure at a temperature between about 390 degrees F. and 440 degrees F. for several hours in the presence of superheated steam to remove volatile constituents.

16. Hydrogenated soya bean oil, having improved color and a substantially extended pre-reversion period, comprising the reaction product, under reduced pressure in the presence of superheated steam and at temperatures between about 390 degrees F. and 440 degrees F., of hydrogenated soya bean oil and between about 0.1% and 0.5%, based on the weight of the oil, of sucrose.

17. In a method of improving hydrogenated soya bean oil, particularly with respect to extending its pre-reversion period, the steps which include mixing said oil with about 0.2%, based on the weight of the oil, of sucrose, and heating the resulting product in a substantially non-oxidizing atmosphere at a temperature of the order of about 390 degrees F. to 440 degrees F. for a substantial period of time.

18. In a method of improving hydrogenated soya bean oil, particularly with respect to extending its pre-reversion period, the steps which comprise mixing said oil with between about 0.1% and 0.5%, based on the weight of the oil, of sucrose, and heating the resulting product under an absolute pressure of about 6.5 mm. to 15 mm. of mercury at a temperature of about 390 degrees F. to 440 degrees F. for several hours in the presence of superheated steam to effect a reaction between the sucrose and the oil or a constituent thereof and to remove volatile constituents.

19. Hydrogenated soya bean oil, having improved color and a substantially extended pre-reversion period, comprising the reaction product, under reduced pressure in the presence of superheated steam and at a temperature of about 430 degrees F., of hydrogenated soya bean oil and about 0.2%, based on the weight of the oil, of sucrose.

ALBERT K. EPSTEIN.
MYRON L. HARTLEY.